United States Patent
Barry et al.

(10) Patent No.: US 11,263,576 B2
(45) Date of Patent: Mar. 1, 2022

(54) AUDITING OF BUSINESS CONTROLS USING ANALYTIC CONTROL TESTS

(71) Applicant: AMERICAN EXPRESS TRAVEL RELATED SERVICES COMPANY, INC., New York, NY (US)

(72) Inventors: Jill Anne Barry, Long Island City, NY (US); Donald W. Gallien, Phoenix, AZ (US); Craig Greenberg, Dix Hills, NY (US); Jeremy D. Harlow, Woodstock, NY (US); Brian Russell Kenny, New York, NY (US); Bradley Eugene Morgan, South Jordan, UT (US); Jaydip Mukhopadhyay, Fort Lee, NJ (US); Reshmi Muthraja, Franklin Square, NY (US); Brian James Selden, Sandy, UT (US)

(73) Assignee: AMERICAN EXPRESS TRAVEL RELATED SERVICES COMPANY INC., New York, NY (US)

( * ) Notice: Subject to any disclaimer, the term of this patent is extended or adjusted under 35 U.S.C. 154(b) by 78 days.

(21) Appl. No.: 16/565,959

(22) Filed: Sep. 10, 2019

(65) Prior Publication Data

US 2021/0073706 A1 Mar. 11, 2021

(51) Int. Cl.
*G06Q 10/06* (2012.01)

(52) U.S. Cl.
CPC .............................. *G06Q 10/06395* (2013.01)

(58) Field of Classification Search
None
See application file for complete search history.

(56) References Cited

U.S. PATENT DOCUMENTS

| | | | | |
|---|---|---|---|---|
| 6,601,233 B1 * | 7/2003 | Underwood | ............... | G06F 8/24 717/100 |
| 6,957,186 B1 * | 10/2005 | Guheen | ................... | G06Q 99/00 705/323 |
| 8,311,863 B1 * | 11/2012 | Kemp | ................ | G06Q 10/0639 705/7.11 |
| 9,483,338 B2 * | 11/2016 | Bhalla | ....................... | G06N 5/04 |
| 10,181,982 B2 * | 1/2019 | Tapia | ...................... | H04L 43/08 |

(Continued)

OTHER PUBLICATIONS

Bagchi, Sugato, Xue Bai, and Jayant Kalagnanam. "Data quality management using business process modeling." 2006 IEEE International Conference on Services Computing (SCC'06). IEEE, 2006. (Year: 2006).*

(Continued)

*Primary Examiner* — Thomas L Mansfield
(74) *Attorney, Agent, or Firm* — Thomas | Horstemeyer, LLP

(57) ABSTRACT

Systems and methods for auditing business controls are disclosed. The system may receive or retrieve data from one or more data sources corresponding to a business control. The system may perform a direct analytic control test (ACT) or an indirect ACT on the data. The system may compare a direct ACT result or an indirect ACT result to an ACT threshold. The ACT threshold may comprise separate direct ACT thresholds and indirect ACT thresholds. Based on the comparison, the system may determine an operating effectiveness of the business control.

12 Claims, 4 Drawing Sheets

(56) References Cited

U.S. PATENT DOCUMENTS

| | | | | |
|---|---|---|---|---|
| 2003/0086536 A1* | 5/2003 | Salzberg | ................ | H04M 3/22 |
| | | | | 379/15.02 |
| 2003/0233249 A1* | 12/2003 | Walsh | ................ | G06Q 10/067 |
| | | | | 709/203 |
| 2006/0161814 A1* | 7/2006 | Wocke | ................ | G06K 9/6251 |
| | | | | 714/26 |
| 2007/0198312 A1* | 8/2007 | Bagchi | ................ | G06F 16/215 |
| | | | | 705/7.41 |
| 2016/0127808 A1* | 5/2016 | Wong | ................ | H04L 45/125 |
| | | | | 379/112.04 |
| 2016/0254827 A1* | 9/2016 | Akimoto | ............ | G06F 11/0793 |
| | | | | 714/774 |
| 2016/0371612 A1* | 12/2016 | Bagchi | ............ | G06Q 10/06395 |
| 2017/0180567 A1* | 6/2017 | Sharma | ................ | H04M 15/08 |
| 2020/0044787 A1* | 2/2020 | Wang | ................ | H04L 1/18 |

OTHER PUBLICATIONS

Alles, Michael, et al. "Continuous monitoring of business process controls: A pilot implementation of a continuous auditing system at Siemens." International Journal of Accounting Information Systems 7.2 (2006): 137-161. (Year: 2006).*

* cited by examiner

AUDITING OF BUSINESS CONTROLS USING ANALYTIC CONTROL TESTS

FIELD

The disclosure generally relates to the auditing of business controls, and more specifically, to systems and methods for auditing business controls using direct and indirect analytic control tests.

BACKGROUND

A business process may comprise one or more business controls configured to ensure that the business process meets one or more requirements. For example, financial institutions and transaction account issuers may have various business processes related to data received from, transmitted to, and/or processed by external merchants, vendors, customers, marketplaces, and/or the like. The various business processes may each have one or more business controls configured to ensure that each business process complies with internal or external guidelines, regulations, legal requirements, and/or the like.

Entities may desire to audit the business process to ensure that the business controls are functioning correctly. Typically, the business controls are audited by taking a sampling of data processed under a particular business process, and by reviewing the data to determine whether the business control effectively operated. The determination may be based on established criteria, and the conclusion may be binary (e.g., the business control is effective or non-effective). The typical sampling process may inherently include sample risks leading to erroneous conclusions of the business controls and/or conclusions that do not transparently qualify the extent and/or impact of the underlying issue. Moreover, a technical problem is that reviewing all data processed under a particular business process using typical auditing techniques may be costly and may be burdensome to processing, data storage, and bandwidth in a computer-based system.

SUMMARY

Systems, methods, and articles of manufacture (collectively, the "system") for auditing business controls are disclosed. The system may receive data from a data source. The data may be associated with a business control. The system may perform an analytic control test (ACT) on the data. The system may compare an ACT result to an ACT threshold. The system may determine an operating effectiveness of the business control based on the comparing the ACT result to the ACT threshold.

In various embodiments, the system may perform a direct ACT on the data. The system may compare a direct ACT result to a direct ACT threshold. The system may perform the direct ACT by calculating an actual error rate in the data; determining an error rate observation relative difference; determining an error rate lifetime relative difference; and determining a consecutive rate change of the actual error rate in the data. The system may compare the direct ACT result to the direct ACT threshold by comparing the actual error rate to an actual error rate threshold; comparing the error rate observation relative difference to an error rate observation relative difference threshold; comparing the error rate lifetime relative difference to an error rate lifetime relative difference threshold; and comparing the consecutive rate change to a consecutive rate change threshold.

In various embodiments, the system may perform an indirect ACT on the data. The system may compare the indirect ACT result to an indirect ACT threshold. The system may perform the indirect ACT by calculating an actual coefficient of variation in the data; determining a coefficient of variation observation relative difference; determining a coefficient of variation lifetime relative difference; and determining a consecutive variation change of the actual coefficient of variation in the data. The system may compare the indirect ACT result to the indirect ACT threshold by comparing the actual coefficient of variation to an actual coefficient of variation threshold; comparing the coefficient of variation observation relative difference to a coefficient of variation observation relative difference threshold; comparing the coefficient of variation lifetime relative difference to a coefficient of variation lifetime relative difference threshold; and comparing the consecutive variation change to a consecutive variation change threshold.

In various embodiments, the data may be received from the data source based on at least one of a business process or an auditing time period. The business control may be from the business process. The system may generate an audit report based on at least one of the ACT result or the operating effectiveness of the business control.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
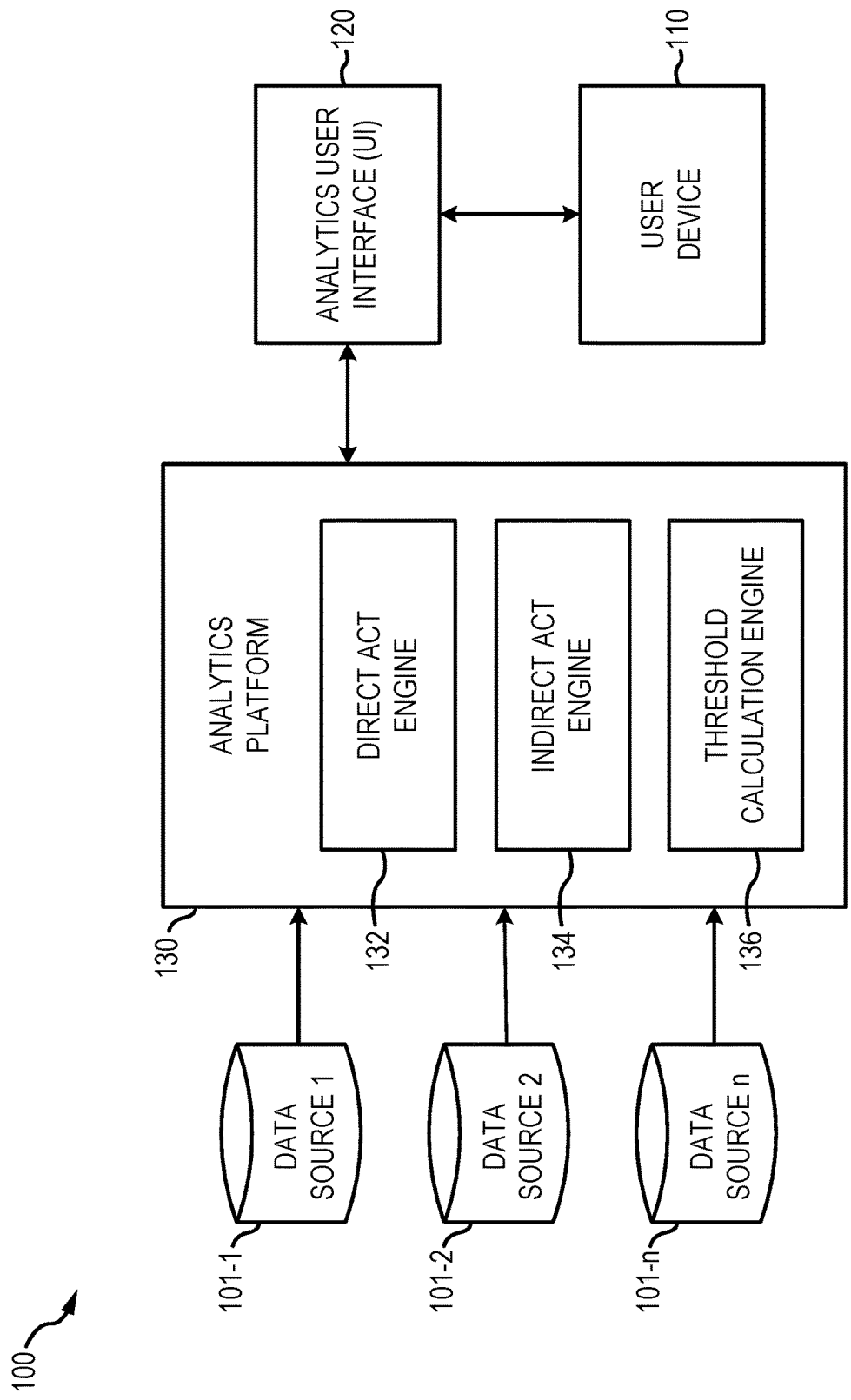
FIG. 1 is a block diagram illustrating various system components of a system for auditing business controls, in accordance with various embodiments.

Systems and methods for auditing business controls are disclosed. In contrast to typical prior business control auditing systems that rely on sampling techniques to evaluate business controls, in various embodiments, the present system may provide a data driven auditing framework configured to evaluate business controls based on analytic control tests (ACTs). The system may apply the ACTs to evaluate data collected under a business process or business control over a given time period (e.g., 6 months, 12 months, 18 months, etc.). For example, the system may provide a direct ACT and an indirect ACT to evaluate a business control, as discussed further herein.

As discussed herein, a "business process" may refer to any receipt, transmission, and/or processing of data by the system. For example, in a practical application, wherein the system is associated with a financial institution, a business process may comprise the receipt and processing of a customer application to open a transaction account. In various embodiments, and in another practical application, a business process may involve assessing whether credit should be extended to a customer. In another practical application, a business process may involve determining whether changes to existing and future customer relationships should occur. As discussed herein, a "business control" may refer to a data requirement in the business process. For example, in a practical application, a business control may comprise a know your customer (KYC) regulation, a legal requirement, a regulatory requirement, a business requirement, an internal control or process, and/or the like. As a further example of the business process including a customer application to open a transaction account, one business control may comprise a requirement for a social security number (SSN). In various embodiments, and in another practical application, a business control may automatically prevent the extension of credit to a customer when a credit worthiness metric falls below a threshold value. In another practical application, a business control may review, on a periodic or event driven basis, a set of customer attributes determinative of the changes to existing and future customer relationships.

Phrases and terms similar to "financial institution" or "transaction account issuer" may include any entity that offers financial services. Although often referred to as a "financial institution," the financial institution may represent any type of bank, lender, or other type of account issuing institution, such as credit card companies, card sponsoring companies, or third party issuers under contract with financial institutions. It is further noted that other participants may be involved in some phases of the transaction, such as an intermediary settlement institution.

The system further improves the functioning of the computer. For example, by auditing business controls using the processes disclosed herein, the system may improve the integrity of the business control and ensure that the business control is functioning efficiently and correctly. By improving the integrity of the business control, the system may not need to re-audit the business control, which saves on data storage and memory which speeds processing. For example, the system may centralize the processes described herein thereby decreasing parallel recordkeeping in multiple data environments and improving storage capacity. Similarly, the process may increase the reliability and speed of data presentation by reducing search friction and network calls across data environments. In this regard, by transmitting, storing, and/or accessing data using the processes described herein, the informational utility of the data is improved and errors are reduced. Such improvements also increase the efficiency of the network by reducing a portion of duplicated processing and search effort. In various embodiments, the processes may increase network availability by reducing front end and back end process calls. In this regard, the processes may save processing resources including CPU time, memory resources, and/or network resources.

In various embodiments, and with reference to FIG. 1, a system 100 for auditing business controls is disclosed. System 100 may comprise one or more data sources 101, user devices 110, and/or analytics platforms 130. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, system 100 may comprise any number of data sources 101, such as, for example, a first data source 101-1, a second data source 101-2, and "Nth" data source 101-$n$, etc. Each data source 101 may be in one or more logical and/or virtual data environments, servers, databases, processing platforms, or the like. Data sources 101 may comprise one or more sources of data, and each source of data may store and maintain any desired type of data. In various embodiments, one or more of the data sources 101 may comprise sources of financial and/or transaction data including, for example, transaction account holder data, accounts receivable data, merchant data, and/or the like. For example, one or more data sources 101 may comprise transactional databases, accounts receivable databases, accounts payable databases, account subscriber databases, and/or the like. The data from each data source may comprise data to be processed by a business process, and subject to one or more business controls.

In various embodiments, user device 110 may be in electronic communication with analytics platform 130, directly or via an analytics user interface (UI) 120. User device 110 may comprise any suitable hardware, software, and/or database components capable of sending, receiving, and storing data. For example, user device 110 may comprise a personal computer, personal digital assistant, cellular phone, smartphone (e.g., IPHONE®, BLACKBERRY®, and/or the like), IoT device, kiosk, and/or the like. User device 110 may comprise an operating system, such as, for example, a WINDOWS® mobile operating system, an ANDROID® operating system, APPLE® IOS®, a BLACKBERRY® operating system, a LINUX® operating system, and the like. User device 110 may also comprise software components installed on user device 110 and configured to enable access to various system 100 components. For example, user device 110 may comprise a web browser (e.g., MICROSOFT INTERNET EXPLORER®, GOOGLE CHROME®, etc.), an application, a micro-app or mobile application, or the like, configured to allow the user device to access and interact with analytics platform 130 (e.g., directly or via analytics UI 120, as discussed further herein).

In various embodiments, user device 110 may be configured to communicate with and/or interact with analytics platform 130 via analytics UI 120. Analytics UI 120 may comprise a graphical user interface (GUI) accessible via a mobile application, web browser, software application, or the like. For example, user device 110 may interact with analytics UI 120 to instruct analytics platform 130 to audit a business control. The instructions may specify an auditing dataset, an auditing business process and/or business control, or the like. The instructions may further specify an auditing time period (e.g., 6 months, 12 months, 18 months, etc.). User device 110 may also interact with analytics UI 120 to review results from a business control audit. For example, analytics UI 120 may display one or more audit reports. The audit reports may display ACT results for a business control, an operating effectiveness of the business control, and/or the like. The audit reports may be generated and customized as desired, such as, for example, sorted by user, business control, business process, operating effectiveness, and/or the like.

In various embodiments, analytics platform 130 may be in electronic communication with one or more data sources 101 and/or user device 110 (e.g., directly or via analytics UI 120). Analytics platform 130 may be configured to audit business controls and/or business processes by performing analytic control tests (ACTs) on data corresponding to each business control. Analytics platform 130 may comprise one or more hardware, software, and/or database components. For example, analytics platform 130 may comprise one or more network environments, servers, computer-based systems, processors, databases, and/or the like. Analytics platform 130 may comprise at least one computing device in the form of a computer or processor, or a set of computers/processors, although other types of computing units or systems may be used such as, for example, a server, web server, pooled servers, or the like. Analytics platform 130 may also include software, such as services, APIs, and the like, configured to perform various operations discussed herein. In various embodiments, analytics platform 130 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein.

In various embodiments, analytics platform 130 may comprise one or more hardware, software, and/or database components configured to perform the ACTs. For example, analytics platform 130 may comprise a direct ACT engine 132, an indirect ACT engine 134, and/or a threshold calculation engine 136.

Direct ACT engine 132 may be configured to perform a direct ACT on data received (or retrieved) from one or more data source 101. As discussed further herein, the direct ACT may be configured to measure the effectiveness of a business control based on the calculation of an error rate. For example, results from the direct ACT (e.g., the direct ACT results) may include the calculation of an actual error rate, a historical error rate, an observation relative difference, a lifetime relative difference, a consecutive rate change (e.g., increase or decrease) of the error rate, and/or the like. Implementation of the direct ACT may further include the use of one or more direct ACT thresholds configured to evaluate the direct ACT results, such as, for example, an operational threshold, a low tolerance threshold, a high tolerance threshold, or the like.

Indirect ACT engine 134 may be configured to perform an indirect ACT on data received (or retrieved) from one or more data source 101. The indirect ACT may be configured to measure relative variability of the data to determine whether the business control is operating consistently over time. As discussed further herein, the indirect ACT may be configured to measure the effectiveness of a business control based on the calculation of a coefficient of variation. For example, results from the indirect ACT (e.g., the indirect ACT results) may include the calculation of an actual coefficient of variation, a historical coefficient of variation, an observation relative difference, a lifetime relative difference, a consecutive variation change, and/or the like. Implementation of the indirect ACT may further include the use of one or more indirect ACT thresholds configured to evaluate the indirect ACT results.

Threshold calculation engine 136 may be configured to compare results from direct ACT engine 132 and/or indirect ACT engine 134 against one or more ACT thresholds. For example, and as discussed further herein, threshold calculation engine 136 may be configured to compare the results of the direct ACT (e.g., the direct ACT results) to one or more direct ACT thresholds, and/or the results of the indirect ACT (e.g., the indirect ACT results) to one or more indirect ACT thresholds. Analytics platform 130 may be configured to determine an operating effectiveness of a business control based on the comparisons. For example, in response to at least of the direct ACT results being greater than, or greater than or equal to, the corresponding direct ACT threshold, analytics platform 130 may determine that the business control is not operating effectively. As a further example, in response to at least of the indirect ACT results being greater than, or greater than or equal to, the corresponding indirect ACT threshold, analytics platform 130 may determine that the business control is not operating effectively.

Figure 2:
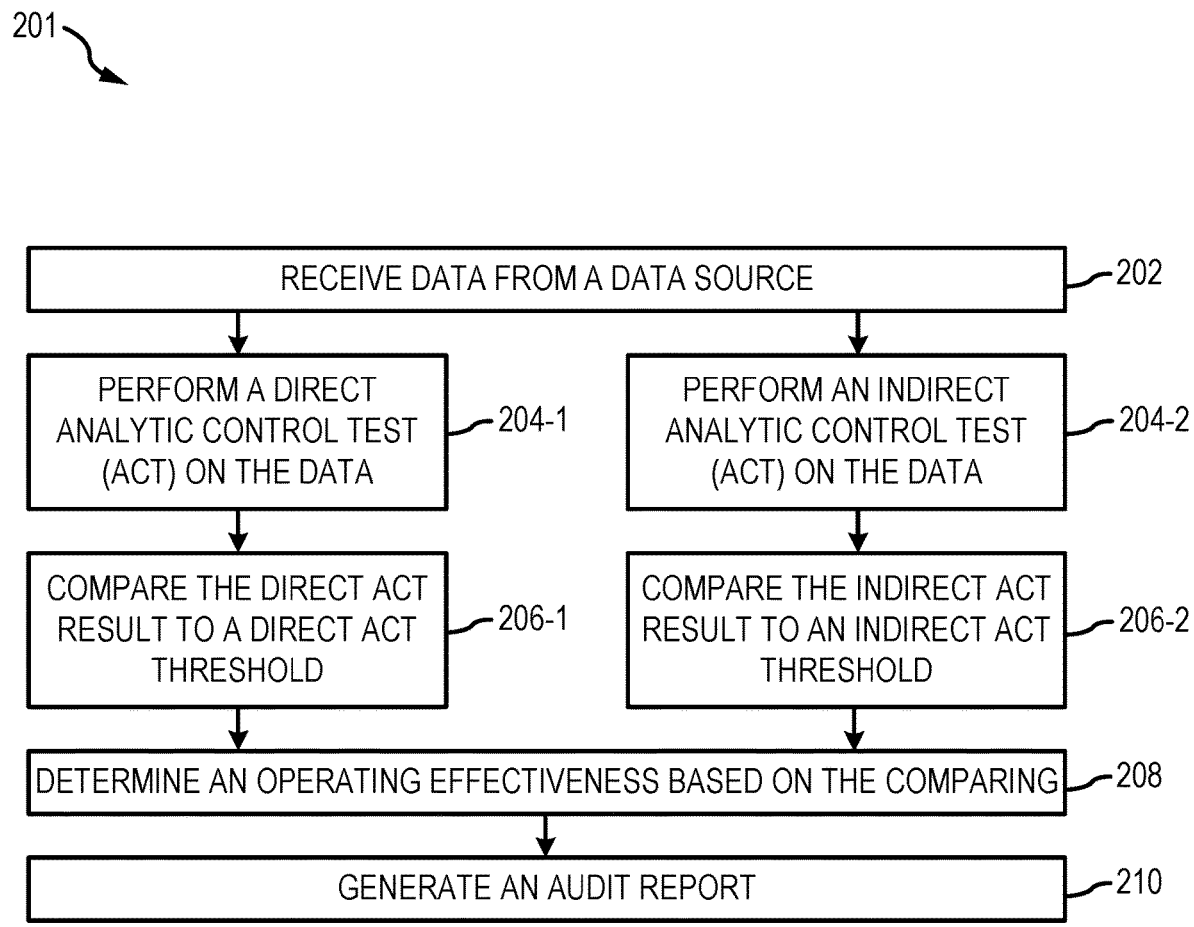
FIG. 2 illustrates a process flow for a method of auditing business controls, in accordance with various embodiments.
Figure 3:
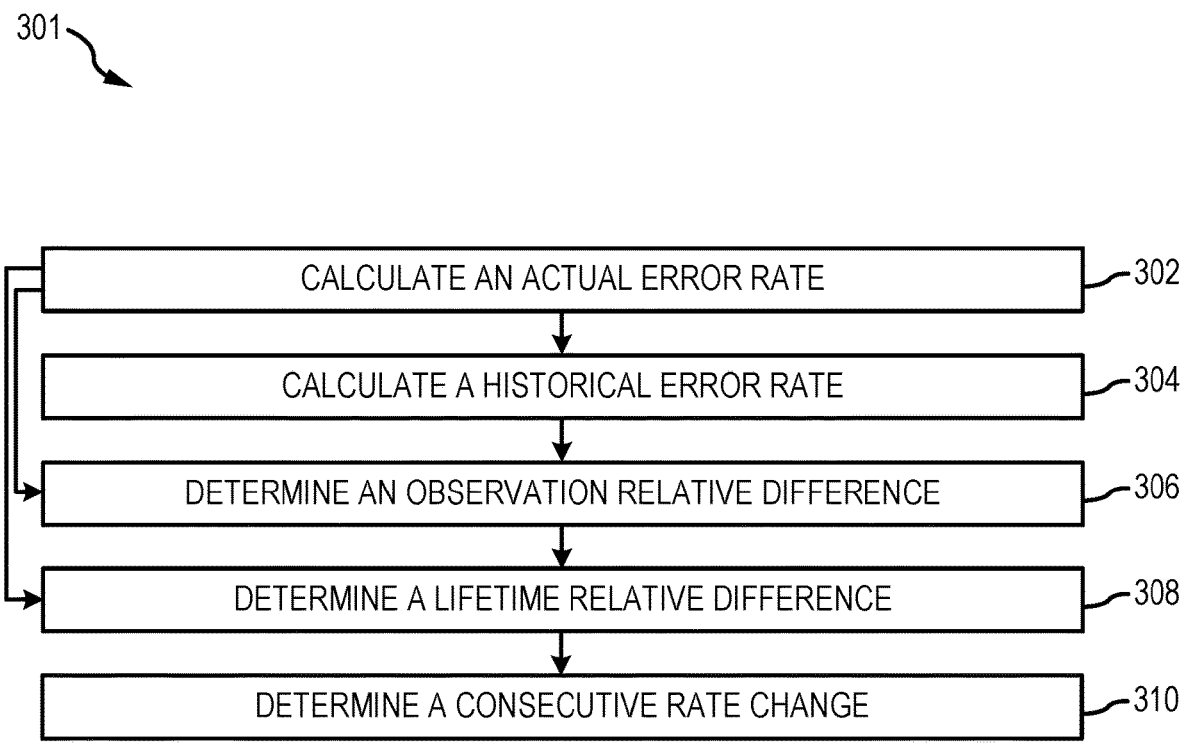
FIG. 3 illustrates a process flow for a method of performing a direct analytic control test, in accordance with various embodiments.
Figure 4:
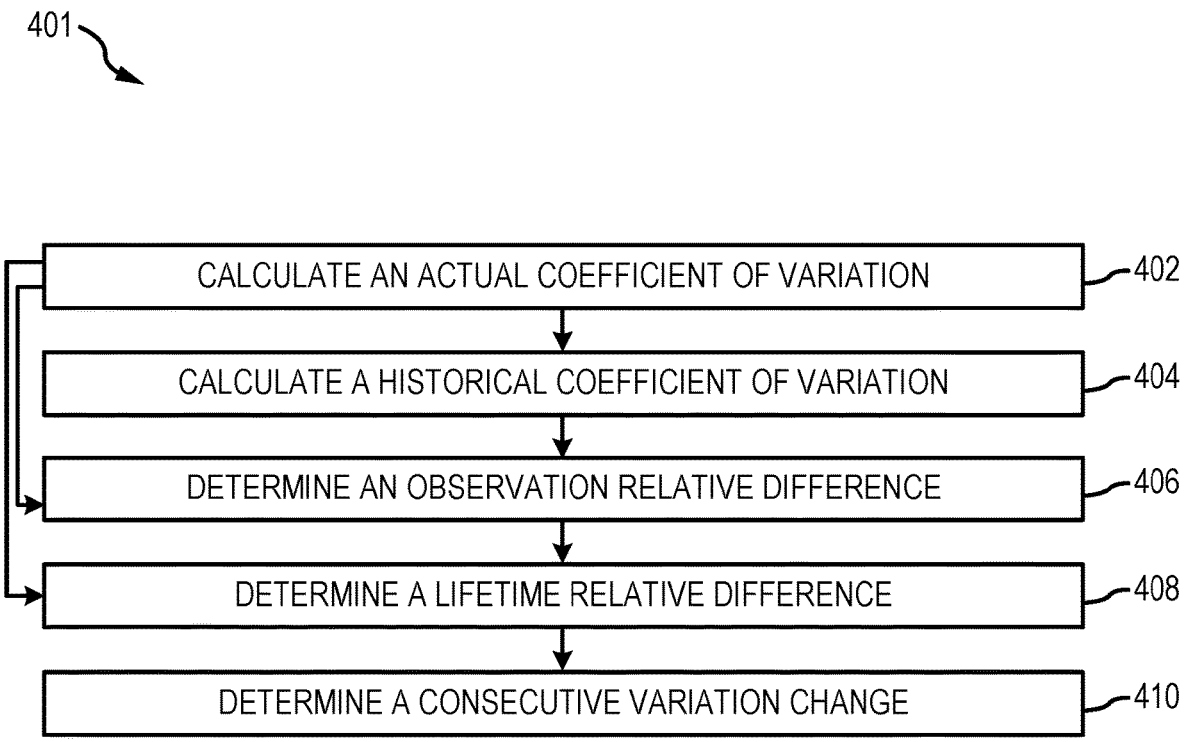
FIG. 4 illustrates a process flow for a method of performing an indirect analytic control tests, in accordance with various embodiments.

Referring now to FIGS. 2-4 the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-4, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With specific reference to FIG. 2, a method 201 for auditing business controls is disclosed. The system may receive (or retrieve) data from a data source (step 202). More specifically, analytics platform 130 may be configured to receive (or retrieve) the data from one or more data sources 101. In various embodiments, analytics platform 130 may receive instruction from analytics UI 120 to retrieve data from a data source 101. For example, user device 110 may instruct analytics platform 130, via analytics UI 120, to retrieve data from the data source 101. The instructions may specify an auditing dataset, an auditing business process and/or business control, or the like. The instructions may further specify an auditing time period (e.g., 6 months, 12 months, 18 months, etc.). For example, data in the data source 101 may be stored by business process or business control, or may be associated with the business process or business control via an identifier, metadata, tags, notes, or the like. The data may also comprise a timestamp such that analytics platform 130 may retrieve only data within the auditing time period. In various embodiments, the data sources may be predefined (i.e., specified by hard coding of the system) or may be generated based on a machine learning algorithm. In various embodiments, the system receive and/or retrieve the data on a scheduled basis and/or an event driven basis.

In various embodiments, the system may perform a direct analytic control test (ACT) on the data (step 204-1). The direct ACT may be configured as a direct measurement to establish a binary conclusion of whether the business control is operating correctly or not. For example, in accordance with various embodiments and with reference to FIG. 3, a method 301 for performing a direct ACT is disclosed. The system may calculate an actual error rate (step 302). Direct ACT engine 132 may be configured to calculate the actual error rate in the received data. The actual error rate may be calculated as the number of errors in the dataset divided by the number of records in the dataset (e.g., the population).

The dataset may be defined as the data received from the auditing time period. As an example, wherein a dataset population of 1,000 records comprises 10 errors, the actual error rate may be calculated as 0.01, or 1%. An "error" in the dataset may be defined based on the business control. For example, wherein the business control is a KYC regulation requiring a social security number (SSN), an error may be defined as a missing SSN, an incorrectly formatted SSN (e.g., incompatible format, inclusion of non-numeric characters, etc.), or the like. In various embodiments, the business control may define a single error, or a plurality of errors. In various embodiments, the business controls are predefined or may be user defined. In various embodiments, an ACT may determine an invalid date of birth associated with a transaction account and determine whether the invalid date of birth was transmitted to a third party such as, for example, a credit reporting bureau. In various embodiments, an ACT may determine a portion of current active accounts not flagged when an associated account holder is reported deceased. In various embodiments, an ACT may determine a set of accounts charged an insurance premium wherein the insurance premium charge is dissociated from a corresponding charge at a merchant. In various embodiments, an ACT may determine a set of user accounts having associated rewards points exceeding a rewards point threshold.

The system may calculate an historical error rate (step 304). Direct ACT engine 132 may be configured to calculate the historical error rate based on all data associated with the business control (e.g., not limited to the auditing time period). The historical error rate may be calculated as the number of errors in the dataset divided by the number of records in the dataset (e.g., the population). As an example, wherein a lifetime dataset population of 100,000 records comprises 1000 errors, the historical error rate may be calculated as 0.01, or 1%. In various embodiments, the historical error rate may be calculated and maintained over time, and may be stored in analytics platform 130. The historical error rate may be used as a baseline to measure the actual error rate. In various embodiments, and as discussed further herein, the historical error rate may also be used to establish one or more direct ACT thresholds.

The system may determine an observation relative difference (step 306). Direct ACT engine 132 may be configured to determine the observation relative difference (e.g., an error rate observation relative difference). An observation may be defined each time a business control is audited. The observation relative difference may measure the absolute difference in the actual error rate between observations (e.g., between each observation separated by the auditing time period, monthly observations, etc.). For example, the observation relative difference may be calculated as the absolute difference between the observations divided by the maximum absolute value of the two observations. In that regard, the observation relative difference may be configured to identify significant fluctuation of the actual error rate between observations. The maximum absolute value of the two observations may be selected as the denominator in the calculation to ensure that decreases in the actual error rate receive the same level of audit detection as increases in the actual error rate.

The system may determine a lifetime relative difference (step 308). Direct ACT engine 132 may be configured to determine the lifetime relative difference (e.g., an error rate lifetime relative difference). The lifetime relative difference may measure the absolute difference in the actual error rate between a first observation and a last observation for a given business control. For example, the lifetime relative difference may be calculated as the absolute difference between the first observation and the last observation divided by the maximum absolute value of the first observation and the last observation. In that regard, the lifetime relative difference may be configured to identify significant fluctuation of the actual error rate during the lifetime of observing the business control. The maximum absolute value of the first observation and the last observation may be selected as the denominator in the calculation to ensure that decreases in the actual error rate receive the same level of audit detection as increases in the actual error rate.

The system may determine a consecutive rate change (step 310). Direct ACT engine 132 may be configured to determine the consecutive rate change (e.g., increases or decreases) in the actual error rate between observations. For example, in response to the actual error rate in a first observation comprising 0.01 or 1%, in a second observation comprising 0.03 or 3%, in a third observation comprising 0.045 or 4.5%, and in a fourth observation comprising 0.05 or 5%, the consecutive rate change may comprise 4 (e.g., four consecutive observations with increasing error rates).

With reference again to FIG. 2, the system may compare the results of the direct ACT to a direct ACT threshold (step 206-1). Threshold calculation engine 136 may be configured to compare the results of the direct ACT (e.g., the direct ACT results) to one or more direct ACT thresholds. Each of the direct ACT results may be associated with a direct ACT threshold. For example, the direct ACT thresholds may comprise an actual error rate threshold, an error rate observation relative difference threshold, an error rate lifetime relative difference threshold, and/or a consecutive rate change threshold. Threshold calculation engine 136 may be configured to compare the actual error rate to the actual error rate threshold, the error rate observation relative difference to the error rate observation relative difference threshold, the error rate lifetime relative difference to the error rate lifetime relative difference threshold, and/or the consecutive rate change to the consecutive rate change threshold.

Each direct ACT threshold may comprise any suitable or desired value that the direct ACT result is compared against. In various embodiments, one or more of the direct ACT thresholds may be based on machine learning, a statistical analysis, and/or any other historical review of error rates from the business control. The direct ACT thresholds may vary based on the criticality of the business control being audited. For example, the direct ACT thresholds may comprise an operational threshold, a low tolerance threshold, a zero tolerance threshold, and/or any other suitable threshold. The operational threshold may comprise a default or highest threshold for testing operational controls. The low tolerance threshold may comprise a lower threshold in comparison the operational threshold, and may generally be used when testing compliance with consumer regulations. The high tolerance threshold may be the most stringent threshold, and may generally be used when testing compliance with legal requirements. As an example, an actual error rate threshold for an operation threshold may comprise less than 2%, for a low tolerance threshold less than 1%, and for a zero tolerance threshold equal to 0%.

In various embodiments, the system may perform an indirect analytic control test (ACT) on the data (step 204-2). The indirect ACT may be configured to measure relative variability of the data to determine whether the business control is operating consistently over time. With reference to FIG. 4, an exemplary method 401 for performing an indirect ACT is disclosed. The system may calculate a coefficient of variation (step 402). Indirect ACT engine 134 may be configured to calculate the coefficient of variation in the received data (e.g., the data received corresponding to the auditing time period). The coefficient of variation may be configured to measure relative variability of actual errors in the received data. Indirect ACT engine 134 may calculate the coefficient of variation by calculating a standard deviation of actual errors in the received data, calculating an arithmetic mean of actual errors, and dividing the standard deviation by the arithmetic mean. In that regard, a lower coefficient of variation may indicate a lower level of dispersion around the arithmetic mean. A lower level of dispersion may imply an increased likelihood that the business control is operating consistently in the same manner over a period of time.

The system may calculate a historical coefficient of variation (step 404). Indirect ACT engine 134 may be configured to calculate the historical coefficient of variation based on all data associated with the business control (e.g., not limited to the auditing time period). Indirect ACT engine 134 may calculate the historical coefficient of variation by calculating a standard deviation of actual errors in the dataset, calculating an arithmetic mean of actual errors, and dividing the standard deviation by the arithmetic mean. In various embodiments, the historical coefficient of variation may be calculated and maintained over time, and may be stored in analytics platform 130.

The system may determine an observation relative difference (step 406). Indirect ACT engine 134 may be configured to determine the observation relative difference (e.g., a coefficient of variation observation relative difference). The observation relative difference may measure the absolute difference in the coefficient of variation between observations (e.g., between each observation separated by the auditing time period, monthly observations, etc.). For example, the observation relative difference may be calculated as the absolute difference between the observations divided by the maximum absolute value of the two observations. In that regard, the observation relative difference may be configured to identify significant fluctuation of the coefficient of variation between observations. The maximum absolute value of the two observations may be selected as the denominator in the calculation to ensure that decreases in the coefficient of variation receive the same level of audit detection as increases in the coefficient of variation.

The system may determine a lifetime relative difference (step 408). Indirect ACT engine 134 may be configured to determine the lifetime relative difference (e.g., a coefficient of variation lifetime relative difference). The lifetime relative difference may measure the absolute difference in the coefficient of variation between a first observation and a last observation for a given business control. For example, the lifetime relative difference may be calculated as the absolute difference between the first observation and the last observation divided by the maximum absolute value of the first observation and the last observation. In that regard, the lifetime relative difference may be configured to identify significant fluctuation of the coefficient of variation during the lifetime of observing the business control. The maximum absolute value of the first observation and the last observation may be selected as the denominator in the calculation to ensure that decreases in the actual coefficient of variation receive the same level of audit detection as increases in the coefficient of variation.

The system may determine a consecutive variation change (step 410). Indirect ACT engine 134 may be configured to determine the consecutive variation change (e.g., increases or decreases) in the coefficient of variation between observations. For example, in response to the coefficient of variation in a first observation comprising 0.010, in a second observation comprising 0.015, in a third observation comprising 0.020, and in a fourth observation comprising 0.040, the consecutive variation change may comprise 4 (e.g., four consecutive observations with increasing coefficient of variations).

With reference again to FIG. 2, the system may compare the results of the indirect ACT to an indirect ACT threshold (step 206-2). Threshold calculation engine 136 may be configured to compare the results of the indirect ACT (e.g., the indirect ACT results) to one or more indirect ACT thresholds. Each of the indirect ACT results may be associated with an indirect ACT threshold. For example, the indirect ACT thresholds may comprise an actual coefficient of variation threshold, a coefficient of variation observation relative difference threshold, a coefficient of variation lifetime relative difference threshold, and/or a consecutive variation change threshold. Threshold calculation engine 136 may be configured to compare the actual coefficient of variation to the actual coefficient of variation threshold, the coefficient of variation observation relative difference to the coefficient of variation observation relative difference threshold, the coefficient of variation lifetime relative difference to the coefficient of variation lifetime relative difference threshold, and/or the consecutive variation change to the consecutive variation change threshold.

Each indirect ACT threshold may comprise any suitable or desired value that the indirect ACT result is compared against. In various embodiments, one or more of the indirect ACT thresholds may be based on machine learning, a statistical analysis, and/or any other historical review of coefficient of variations from the business control.

In various embodiments, the system may determine an operating effectiveness (step 208) of the business control. Analytics platform 130 may be configured to determine the operating effectiveness. The operating effectiveness may be based on the comparing completed in steps 206-1 and 206-2. The operating effectiveness may be based on the comparison of the ACT results to the ACT thresholds. For example, in response to at least of the direct ACT results being greater than, or greater than or equal to, the corresponding direct ACT threshold, analytics platform 130 may determine that the business control is not operating effectively. For example, in response to at least of the indirect ACT results being greater than, or greater than or equal to, the corresponding indirect ACT threshold, analytics platform 130 may determine that the business control is not operating effectively.

In various embodiments, in response to determining that the business control is not operating effectively, analytics platform 130 may mark the business control for manual auditing follow up. For example, analytics platform 130 may transmit an audit notification to user device 110, directly or via analytics UI 120. The audit notification may comprise data identifying the business control, together with the one or more ACT results that did not comply with a corresponding ACT threshold.

The system may generate an audit report (step 210). Analytics platform 130 may be configured to generate the audit report for a business control audit. Analytics platform 130 may display the audit report to user device 110, via analytics UI 120. The audit report may be generated to comprise ACT results for a business control, an operating effectiveness of the business control, and/or the like. The audit reports may be generated and customized as desired, such as, for example, sorted by user, business control, business process, operating effectiveness, and/or the like.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The phrases consumer, customer, user, account holder, account affiliate, cardmember, or the like shall include any person, entity, business, government organization, business, software, hardware, or machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, the term "end user," "consumer," "customer," "cardmember," "business," or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Phrases and terms similar to "business" or "merchant" may be used interchangeably with each other and shall mean any person, entity, distributor system, software, and/or hardware that is a provider, broker, and/or any other entity in the distribution chain of goods or services. For example, a merchant may be a grocery store, a retail store, a travel agency, a service provider, an on-line merchant, or the like.

As used herein, "transmit" may include sending at least a portion of electronic data from one system 100 component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "eBook," an "eMagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVING- SOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of system 100 may be implemented as micro-applications, micro-apps, micro-services, or the like. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer-based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer-based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT and XML) programs, helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications. In various embodiments, any communication discussed herein may be accomplished via the internet or an intranet. Communications may be completed using any suitable protocol, such as, for example, IPv4 (base 10), IPv6 (HMAC), and/or any other suitable or desired communications protocol.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX' software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems). In various embodiments, service solutions may also include IaaS environments, PaaS environments, and/or the like.

Users, systems, computer-based systems or the like may communicate with the server via a web client. The web client includes any device or software which communicates via any network such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. In various embodiments, any database may also include a no-SQL database, a key-value database, an in-memory database, a GPU database, and/or the like. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled System and Method for Transaction Account Based Micro-Payments and filed on Jul. 31, 2018, and U.S. application Ser. No. 16/052,416 titled PROCUREMENT SYSTEM USING BLOCKCHAIN and filed on Aug. 1, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using a JAVASCRIPT® run-time environment configured to execute JAVASCRIPT® code outside of a web browser. For example, the software elements of the system may be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager such as, for example, Parallel Multithreaded Machine ("PM2"); a resource and performance monitoring tool such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a processor, data from a data source, wherein the data is associated with a business control;
   performing, by the processor, an indirect analytic control test (ACT) on the data, the indirect ACT measuring a relative variability of the data to determine whether the business control is operating consistently over time, wherein performing the indirect ACT on the data further comprises:
      calculating, by the processor, an actual coefficient of variation in the data;
      determining, by the processor, a coefficient of variation observation relative difference;
      determining, by the processor, a coefficient of variation lifetime relative difference; and
      determining, by the processor, a consecutive variation change of the actual coefficient of variation in the data;
   comparing, by the processor, an indirect ACT result to an indirect ACT threshold by:
      comparing, by the processor, the actual coefficient of variation to an actual coefficient of variation threshold;
      comparing, by the processor, the coefficient of variation observation relative difference to a coefficient of variation observation relative difference threshold;
      comparing, by the processor, the coefficient of variation lifetime relative difference to a coefficient of variation lifetime relative difference threshold; and
      comparing, by the processor, the consecutive variation change to a consecutive variation change threshold; and
   improving the integrity of the business control by determining, by the processor, an operating effectiveness of the business control based at least in part on the comparing of the indirect ACT result to the indirect ACT threshold.

2. The method of claim 1, wherein the data is received from the data source based at least in part on at least one of a business process or an auditing time period.

3. The method of claim 1, further comprising generating, by the processor, an audit report based on the operating effectiveness of the business control.

4. A system comprising:
   a processor; and
   a tangible, non-transitory memory configured to communicate with the processor, the tangible, non-transitory memory having instructions stored thereon that, in response to execution by the processor, cause the processor to perform operations comprising:
      receiving, by the processor, data from a data source, wherein the data is associated with a business control;
      performing, by the processor, an indirect analytic control test (ACT) on the data, the indirect ACT measuring a relative variability of the data to determine whether the business control is operating consistently over time, wherein performing the indirect ACT on the data further comprises:
         calculating, by the processor, an actual coefficient of variation in the data;
         determining, by the processor, a coefficient of variation observation relative difference;
         determining, by the processor, a coefficient of variation lifetime relative difference; and
         determining, by the processor, a consecutive variation change of the actual coefficient of variation in the data;
      comparing, by the processor, an indirect ACT result to an indirect ACT threshold by:
         comparing, by the processor, the actual coefficient of variation to an actual coefficient of variation threshold;
         comparing, by the processor, the coefficient of variation observation relative difference to a coefficient of variation observation relative difference threshold;
         comparing, by the processor, the coefficient of variation lifetime relative difference to a coefficient of variation lifetime relative difference threshold; and
         comparing, by the processor, the consecutive variation change to a consecutive variation change threshold; and
      improving the integrity of the business control by determining, by the processor, an operating effectiveness of the business control based at least in part on the comparing of the indirect ACT result to the indirect ACT threshold.

5. The system of claim 4, wherein the data is received from the data source based at least in part on at least one of a business process or an auditing time period.

6. A non-transitory, computer-readable medium comprising machine-readable instructions that, when executed by a processor of a computing device, cause the computing device to at least:
receive data from a data source, wherein the data is associated with a business control;
perform an indirect analytic control test (ACT) on the data, the indirect ACT measuring a relative variability of the data to determine whether the business control is operating consistently over time, wherein indirect ACT comprises:
calculating an actual coefficient of variation in the data;
determining a coefficient of variation observation relative difference;
determining a coefficient of variation lifetime relative difference; and
determining a consecutive variation change of the actual coefficient of variation in the data;
compare an indirect ACT result to an indirect ACT threshold by:
comparing the actual coefficient of variation to an actual coefficient of variation threshold;
comparing the coefficient of variation observation relative difference to a coefficient of variation observation relative difference threshold;
comparing the coefficient of variation lifetime relative difference to a coefficient of variation lifetime relative difference threshold; and
comparing the consecutive variation change to a consecutive variation change threshold; and
improve the integrity of the business control by determining, by the processor, an operating effectiveness of the business control based at least in part on the comparing of the indirect ACT result to the indirect ACT threshold.

7. The non-transitory, computer-readable medium of claim 6, wherein the data is received from the data source based at least in part on at least one of a business process or an auditing time period.

8. The non-transitory, computer-readable medium of claim 6, and wherein the business control is from the business process.

9. The non-transitory, computer-readable medium of claim 6, wherein the machine readable instructions, when executed by the processor, further cause the computing device to at least generate an audit report based on the operating effectiveness of the business control.

10. The method of claim 2, wherein the business control is from the business process.

11. The system of claim 4, wherein the machine readable instructions, when executed by the processor, further cause the computing device to at least generate an audit report based on the operating effectiveness of the business control.

12. The system of claim 5, wherein the business control is from the business process.

* * * * *